Feb. 5, 1929.
C. M. TERRY
1,701,284
VALVE
Filed Feb. 14, 1925
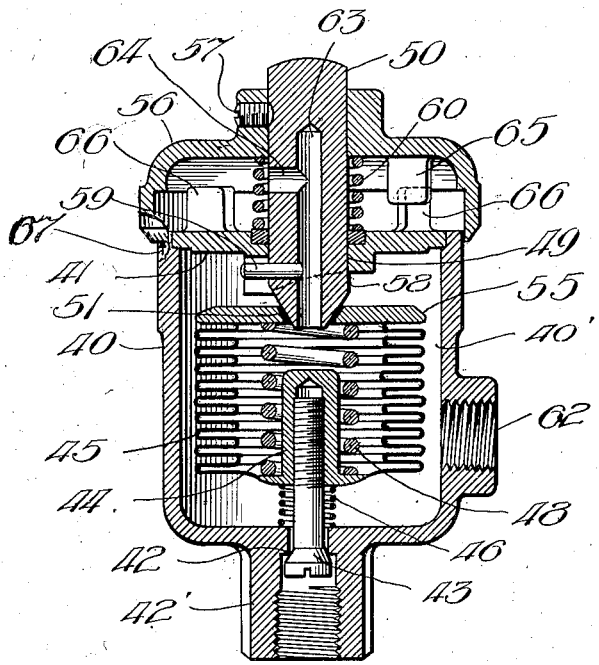
Inventor:
Charles M. Terry
by Rector, Hibben, Davis and Macauley
Attys

Patented Feb. 5, 1929.

1,701,284

UNITED STATES PATENT OFFICE.

CHARLES M. TERRY, OF DECATUR, ILLINOIS, ASSIGNOR TO A. W. CASH COMPANY, OF DECATUR, ILLINOIS, A CORPORATION OF DELAWARE.

VALVE.

Application filed February 14, 1925. Serial No. 9,188.

My invention relates to valves and more particularly to a novel combination and arrangement of pressure reducing and relief valves.

The principal function of pressure reducing valves is to reduce a higher pressure to a lower or reduced pressure and maintain the reduced pressure constant. It is well known that when reducing valves, as heretofore constructed, have been adjusted to maintain the desired reduced pressure and there is no demand for the gas, vapor or other fluid on the reduced pressure side of the valve and there is a leakage through the valve, the pressure on the reduced pressure side of the valve builds up or increases so that the pressure is greater than that for which the valve is set. Furthermore when a pressure reducing valve is employed to handle gases, and there is no demand on the reduced pressure side of the valve or the demand is less than the valve leakage, an increase in temperature causes the gases to expand with the result that the pressure on the reduced side of the valve is raised above the pressure for which the valve is set. It has been common practice to employ a relief valve, installed separately on the reduced pressure side of the reducing valve so that the excess pressure, due either to leakage past the main valve or increase in temperature, as above explained, may be relieved. This arrangement, however, is subject to several disadvantages as the relief valve must be adjusted to relieve at a pressure slightly higher than the reduced pressure for which the reducing valve is adjusted and any change in the adjustment of the reducing valve, to set the same for a different reduced pressure, demands a corresponding change in the adjustment of the relief valve and obviously it is difficult, troublesome, and time consuming to separately adjust the relief valve and reducing valve, so that the proper relation between the two may be established and maintained.

The principal object of my invention is to provide a combined pressure reducing and regulating valve and relief valve so constructed as to overcome the above objections, the two valves being so constructed and arranged that the reducing valve responds precisely to control while the relief valve operates to prevent excessive pressure on the reduced pressure side of the valve under all conditions, regardless of valve leakage or expansion of the fluid on the reduced pressure side, while at the same time adjustment of the reducing valve to establish any new reduced pressure, automatically changes the adjustment of the relief valve, thus necessitating but one adjustment for the two valves. In some installations it may be desirable to maintain a predetermined constant reduced pressure in a closed chamber and under certain conditions to increase or decrease the reduced pressure and hold it constant at the new pressure. In case it is desirable to decrease the reduced pressure it is merely necessary, with my construction, to adjust the reducing valve to maintain the desired reduced pressure, as the excess reduced pressure is automatically relieved through the relief valve which is adjusted in unison with the reducing valve, whereas, in prior constructions it has been necessary to independently operate the relief valve.

Other and further objects of my invention will become apparent from the following description, taken in conjunction with the accompanying drawings, wherein I have shown the preferred form of embodiment of my invention. In the drawings, Fig. 1 is a central vertical section through a valve embodying my invention; and Fig. 2 is a side view of the top plate of the casing shown in Fig. 1.

The casing of the valve shown in Fig. 1 comprises a cylindrical casing 40 having its upper end closed by a disc or plate 41, while its integral bottom is provided with a downwardly extending pipe-receiving boss 42' connected to the source of gas or fluid under pressure. The space in the boss 42' and under the valve seat 42 may be called the high pressure chamber. In the bottom of the casing I provide an opening forming a valve seat 42 normally closed by a valve 43, which is in the form of a bolt having the conical side of its head engaging the seat 42 while its upper threaded end is screwed into the threaded central sleeve 44 of an expansible and contractible corrugated resilient device or casing 45, having a rigid top plate 55. The valve 43 is urged toward its seat by means of a spring 46 under tension between the bottom of the casing 40 and the lower end of the central sleeve 44. Mounted within the casing 45 is a coil spring 48 normally tending to expand the casing 45.

Projecting through a central opening 49 in the head 41 is a plunger or plug 50 having its conical lower end comprising a valve against which is normally seated a seat 51 formed by the opening in the top plate 55 of the flexible casing 45. The plug 50 is secured to an adjustable cap 56 by a screw 57. The cap is in the form of a bell with its lower edge adapted to project slightly over the top edge of the casing 40. The lower side of the plate 41 is provided with an integral circular cam 58 having a lower spiral cam face with which a pin 59, carried by the plug 50, is adapted to contact. A spring 60 is compressed between the plate 41 and the cap 56 and tends to raise the cap and plug 50 thus retaining the pin 59 firmly against the cam face of the cam 58.

From the foregoing description, it will be evident that the fluid under higher pressure is supplied through the pipe connected to the boss 42' and that the chamber 40' of the casing 40 constitutes the outlet chamber or the reduced pressure side of the valve, being provided with the outlet port 62. When the pressure in the chamber 40' falls below the predetermined constant pressure, the flexible casing 45 is expanded by its spring 48 and as its upper head 55 is seated against the plug 50, the valve 43 is opened against the action of the spring 46 to permit flow of the gas or other fluid to the chamber 40' and as soon as the pressure builds up in the chamber to that for which the valve is adjusted the casing 45 is contracted to normal and the valve 43 is again seated. Now, should the pressure in the chamber 40' be raised above the predetermined pressure, due either to leakage past the valve 43 or expansion of the gas in the chamber 40' because of increase in temperature, the flexible casing 45 is contracted by the excessive pressure, with the result that its top plate 55 is moved out of engagement with the seat on the lower end of the plug 50, to open the chamber 40', to the atmosphere through the casing 45, a conduit 63, and port 64 in the plug 50, and the cap 56, which has its edges slightly spaced from the casing 40 so that it is open to the atmosphere. As soon as the pressure in the chamber 40' is reduced to normal the plate 55 again seats against the lower end of the plug 50 in order to close the opening 51 in the flexible casing 45. It will also be observed that by turning the cap 56 the plug 50 is adjusted vertically due to the coaction of its pin 59 with the cam 58 and the valve mechanism may thus be set for any desired constant pressure.

In order to limit the rotation of the plug 50 and cap 56, the cap is provided with a downwardly extending lug 65, while the top 41 of the casing 40 is provided with two oppositely disposed vertically extending lugs 66 adapted to be engaged by the lug 65 in the extreme positions of the cap 56. The edge of the casing 56 may be provided with a scale and the casing with an index point 67 to aid the operator in properly adjusting the valve.

I claim:

1. In a combined pressure reducing, regulating and relief valve mechanism, the combination of a body having a high pressure chamber and a low pressure chamber, a port communicating with said chambers, a valve normally closing said port, an expansible and contractible casing connected to said valve, a port in said casing, and an axially adjustable relief device cooperating with said last mentioned port to relieve the low pressure chamber of excessive pressure.

2. In a combined pressure reducing, regulating and relief valve mechanism, the combination of a body having a high pressure chamber and a low pressure chamber, a port communicating with said chambers, a valve normally closing said port, an expansible and contractible corrugated resilient casing associated with said valve, a port in said casing, and an axially adjustable relief device normally closing said port in the casing and adapted to cooperate therewith to relieve the low pressure chamber of excessive pressure.

3. In a combined pressure reducing, regulating and relief valve mechanism, the combination of a body having a high pressure chamber and a low pressure chamber, a port communicating with said chambers, a valve normally closing said port, an expansible and contractible casing connected to said valve, a port in said casing, and a ported relief plug cooperating with said last mentioned port to relieve the low pressure chamber of excessive pressure.

4. In a combined pressure reducing, regulating and relief valve mechanism, the combination of a body having a high pressure chamber and a low pressure chamber, a port communicating with said chambers, a valve normally closing said port, an expansible and contractible corrugated resilient casing associated with said valve, a port in said casing, and a ported plug normally closing said port in the casing and adapted to open the low pressure chamber to waste when the casing is contracted by excessive pressure in the low pressure chamber.

5. In a combined pressure reducing, regulating and relief valve mechanism, the combination of a body having a high pressure chamber and a low pressure chamber, a port communicating with said chambers, a valve normally closing said port, an expansible and contractible casing connected to said valve, a port in said casing, and a relief device cooperating with said last mentioned port to relieve the lower pressure chamber of excessive pressure, and adjustable to maintain a new constant pressure in the low pressure chamber.

6. In a combined pressure reducing, regulating and relief valve mechanism, the combination of a body having a high pressure chamber and a low pressure chamber, a port communicating with said chambers, a valve normally closing said port, an expansible and contractible casing connected to said valve, a port in said casing, and a ported relief plug cooperating with said last mentioned port to relieve the low pressure chamber of excessive pressure, and adjustable to maintain a new constant pressure in the low pressure chamber.

7. In a combined pressure reducing, regulating and relief valve mechanism, the combination of a body having a high pressure chamber and a low pressure chamber, a port communicating with said chambers, a valve normally closing said port, an expansible and contractible corrugated resilient casing associated with said valve, a port in said casing, a ported plug normally closing said port in the casing and adapted to open the low pressure chamber to waste when the casing is contracted by excessive pressure in the low pressure chamber, and means for adjusting said plug to maintain a new constant pressure in the low pressure chamber.

8. In a combined pressure reducing, regulating and relief valve mechanism, the combination of a body having a high pressure chamber and a low pressure chamber, a port communicating with said chambers, a valve normally closing said port, an expansible and contractible casing connected to said valve, a port in said casing, a spring supporting said casing and tending to hold said valve closed, and a relief device cooperating with said last mentioned port to relieve the low pressure chamber of excessive pressure.

9. In a combined pressure reducing, regulating and relief valve mechanism, the combination of a body having a high pressure chamber and a low pressure chamber, a port communicating with said chambers, a valve normally closing said port, an expansible and contractible corrugated resilient casing associated with said valve, a port in said casing, a spring supporting said casing and valve and tending to hold said valve closed, and a relief device normally closing said port in the casing and adapted to cooperate therewith to relieve the low pressure chamber of excessive pressure.

10. In a combined pressure reducing, regulating and relief valve mechanism, the combination of a body having a high pressure chamber and a low pressure chamber, a port communicating with said chambers, a valve normally closing said port, an expansible and contractible corrugated resilient casing associated with said valve, a port in said casing, a ported plug normally closing said port in the casing and adapted to open the low pressure chamber to waste when the casing is contracted by excessive pressure in the low pressure chamber, a spring supporting said valve and casing, and means for adjusting the plug to maintain a new constant pressure in the low pressure chamber.

11. In a combined pressure reducing, regulating and relief valve mechanism, the combination of a body having a high pressure chamber and a low pressure chamber, a port communicating with said chambers, a valve normally closing said port, an expansible and contractible corrugated resilient casing connected to said valve and having a port, a ported plug normally closing said port in the casing, a spring within said casing normally tending to expand said casing, and a spring supporting said casing and tending to hold said valve closed.

12. In a combined pressure reducing, regulating and relief valve mechanism, the combination of a body having a high pressure chamber and a low pressure chamber, a port communicating with said chambers, a valve normally closing said port, an expansible and contractible corrugated resilient casing connected to said valve and having a port, a ported plug normally closing said port in the casing, a spring within said casing normally tending to expand said casing, a spring supporting said casing and tending to hold said valve closed, and means for adjusting said plug.

13. In a pressure reducing valve mechanism, the combination of a body having a high pressure chamber and a low pressure chamber, a port communicating with said chambers, a valve normally closing said port, an expansible and contractible corrugated resilient casing open to the atmosphere and connected to said valve, a spring in said casing tending to expand the same, and a spring supporting said casing and tending to hold said valve closed.

14. In a pressure reducing valve mechanism, the combination of a body having a high pressure chamber and a low pressure chamber, a port communicating with said chambers, a valve normally closing said port, an expansible and contractible corrugated resilient casing open to the atmosphere, and connected to said valve, a spring in said casing tending to expand the same, a spring supporting said casing and tending to hold said valve closed, and an adjustable device against which one end of the casing bears.

CHARLES M. TERRY.